US006949892B2

(12) United States Patent
Horiuchi et al.

(10) Patent No.: US 6,949,892 B2
(45) Date of Patent: Sep. 27, 2005

(54) LIGHT EMITTING ELEMENT DRIVE DEVICE AND ELECTRONIC DEVICE LIGHT EMITTING ELEMENT

(75) Inventors: Sachito Horiuchi, Kyoto (JP); Noboru Kagemoto, Kyoto (JP); Isao Yamamoto, Kyoto (JP)

(73) Assignee: Rohm Co., Ltd., Kyoto (JP)

(*) Notice: Subject to any disclaimer, the term of this patent is extended or adjusted under 35 U.S.C. 154(b) by 0 days.

(21) Appl. No.: 10/482,429

(22) PCT Filed: May 1, 2003

(86) PCT No.: PCT/JP03/05586

§ 371 (c)(1), (2), (4) Date: Dec. 29, 2003

(87) PCT Pub. No.: WO03/096435

PCT Pub. Date: Nov. 20, 2003

(65) Prior Publication Data

US 2004/0195978 A1 Oct. 7, 2004

(30) Foreign Application Priority Data

May 7, 2002 (JP) ....................................... 2002-131803

(51) Int. Cl.[7] ................................................ H05B 37/02

(52) U.S. Cl. ........................................ 315/308; 315/224

(58) Field of Search ..................... 315/209 R, 224–225, 315/291, 307–308, 185 R; 362/800

(56) References Cited

U.S. PATENT DOCUMENTS 6,362,578 B1 * 3/2002 Swanson et al. ............ 315/307
6,459,919 B1 * 10/2002 Lys et al. ................... 600/407
6,577,080 B2 * 6/2003 Lys et al. ................... 315/362
6,621,235 B2 * 9/2003 Chang ........................ 315/216
6,628,252 B2 * 9/2003 Hoshino et al. .............. 345/82
6,734,639 B2 * 5/2004 Chang et al. ............... 315/291
6,836,081 B2 * 12/2004 Swanson et al. ............ 315/307

FOREIGN PATENT DOCUMENTS

| | | |
|---|---|---|
| JP | 63-226079 | 9/1988 |
| JP | 4-27172 | 1/1992 |
| JP | 5-152662 | 6/1993 |
| JP | 7-235693 | 9/1995 |
| JP | 2002-111786 | 4/2002 |

* cited by examiner

*Primary Examiner*—Thuy Vinh Tran
(74) *Attorney, Agent, or Firm*—Hogan & Hartson LLP

(57) ABSTRACT

An electronic apparatus includes a display device (20) and a drive device (10) for driving the display (20). The display device (20) is equipped with light emitting elements (21–26) such as LEDs driven at high voltages. The display device (20) has a multiplicity of light emitting element series each supplied at one end thereof with a high voltage (Vh) higher than a given power supply voltage (Vdd). The drive device (10) has drivers (12–14) each having one end connected to a respective terminal to which a corresponding one of said multiple light emitting elements series is connected. The drivers are turned ON and OFF in accordance with instruction signals (S1–S3) such that, when turned ON, they provide currents to the series connected. The drive device (10) also has a multiplicity of bypass current source (15–17) for providing the light emitting element series with currents not sufficient to activate the series for emission of light when corresponding drivers are turned OFF. The drive device can be constructed using ICs that are designed to operate at low voltages, thereby facilitating reduction of electric power loss by the electronic apparatus.

8 Claims, 4 Drawing Sheets

LIGHT EMITTING ELEMENT DRIVE DEVICE AND ELECTRONIC DEVICE LIGHT EMITTING ELEMENT

TECHNICAL FIELD

This invention relates to a drive device for driving light emitting elements such as light emitting diodes (LEDs) operated at high voltages, and to an electronic apparatus equipped with such light emitting elements.

BACKGROUND ART

Light emitting elements such as LEDs are used not only as display elements themselves but also as backlight sources of a liquid crystal display (LCD). The number of light emitting elements used depends on the form of the display and the amount of light required for the display.

FIG. 3 shows the appearance of a typical electronic apparatus implemented in the form of a cellular phone utilizing LEDs as its light emitting elements. The cellular phone shown in FIG. 3(*a*) can be folded up as shown in FIG. 3(*b*).

As shown in FIG. 3, the cellular phone has an antenna 1, a large main display section 2 having a large display area, and a control section 3. The cellular phone also has a sub-display section 4 for displaying, for example, receipt of a phone call and e-mail, and for displaying date and hour, while it is folded up. This sub-display section 4 may have a small display area. These display sections 2 and 4 are constituted of LCDs utilizing, for example, white LEDs as backlight sources. The numbers of the LEDs backlighting the display sections 2 and 4 depend on the area of the respective display sections 2 and 4.

FIG. 4 illustrates a conventional circuit for driving LEDs of the cellular phone as shown in FIG. 3. The circuit includes a display device 40 utilizing LEDs and a drive device 30 for driving the display device 40.

The display device 40 has a series of two serially connected LEDs 41 and 42 for the sub-display section 4, and another series connection of four LEDs 43, 44, 45, and 46 providing enhanced intensity of light to the main display section 2.

On the other hand, the drive device 30 includes a step-up type switching power supply circuit 31 for stepping up a power supply voltage Vdd (typically 4V) of a lithium battery for example to a higher step-up output voltage Vhh. The step-up voltage Vhh is set to 18V, since each of white and blue LEDs requires about 4V for emission of light. This step-up voltage Vhh is applied to the LEDs 41–46 through the pin P31 of the drive device 30 and through the pin P41 of the display device 40. The drive device 30 also includes drivers 32 and 33 which are usually implemented as constant-current drivers. Hence, the drivers 32 and 33 supplies constant currents to the LEDs when they are turned ON, and shut down the currents when they are turned OFF, irrespective of the number of LEDs connected in series. The drivers 32 and 33 are turned ON or OFF in accordance with respective display instruction signals to control the operation of the LEDs 41–46.

In this conventional drive device 30 for LEDs, however, it is necessary to generate a sufficiently high voltage in accord with the numbers of the serial LEDs in the respective series by the power supply circuit 31. Consequently, the voltages of the pins P32 and P33 rise to the high step-up voltage Vhh when the drivers 32 and 33 are turned OFF. As a consequence, even though the power supply voltage Vdd is low, ICs designed to operate at an ordinary power supply voltage Vdd cannot be used in the drive device 30, unless the drive device 30 is designed to withstand the high step-up voltage Vhh.

Further, when the LEDs in the respective series are different in number, the constant-current driver 32 having less number of LEDs will consume extremely large power while driving the LEDs. Hence, in order to make the constant-current driver 32 withstand such large power consumption, the driver must be large-sized. Moreover, such large power consumption will result in quick consumption of available battery power.

It is therefore an object of the invention to provide a drive device for driving serially connected light emitting elements (hereinafter referred to as light emitting element series), capable of always impressing voltages lower than the supply voltage to the pins to which the light emitting elements series are connected, irrespective of the number of the light emitting elements in the series, thereby enabling use of low-voltage ICs and minimization of the power consumption by the drivers. It is another object of the invention to provide electronic apparatuses equipped with light emitting elements driven by such drive device.

DISCLOSURE OF INVENTION

In accordance with one aspect of the invention, there is provided a drive device for driving light emitting elements, comprising:

at least one driver having one end connected to a terminal to which one corresponding light emitting element series is connected, the driver turned ON or OFF in accordance with an instruction signal such that, when the driver is turned ON, the driver provides the light emitting element series with a current for emission of light; and at least one bypass means, connected in parallel with the at least one driver, for providing the light emitting element series with a current that is insufficient for the light emitting elements thereof to emit light when the driver is turned OFF. The light emitting elements may be LEDs.

In accordance with another aspect of the invention, there is provided an electronic apparatus equipped with light emitting elements, comprising;

a display device having a multiplicity N of light emitting element series having ends of first ends connected to a voltage higher than a given power supply voltage and second ends connected to different external terminals, the N light emitting element series divided into a multiplicity M ($M \leqq N$) of independently operable sections, and a drive device for driving said light emitting elements, the drive device having:

N drivers respectively connected to the terminals to which the other ends of the N light emitting element series are connected, each of said N drivers turned ON or OFF in accordance with an instruction signal supplied thereto such that when turned ON the driver provides a current to activate associated one of the light emitting element series for emission of light; and N bypass means, connected in parallel with the respective drivers, for providing the corresponding light emitting element series with currents that are insufficient for the associated light emitting elements to emit light when the associated drivers are turned OFF. These light emitting elements may be LEDs.

In this arrangement, activation (or light emission) and deactivation of a respective light emitting element series can be controlled by the ON/OFF status of the corresponding driver in such a way that the voltage of the terminal to which the light emitting element series is connected remains low irrespective of the ON/OFF status of the driver.

The drivers of the invention are constant-current drivers adapted to provide constant currents while they are in operation. The bypass means are constant current sources. The drivers can set up predetermined minute currents through the bypass means while the associated drivers are turned OFF, so that the minute currents render the associated light emitting elements to stay in stabilized non-luminescent conditions.

A display device of the invention has a voltage step-up means for stepping up the power supply voltage to the high voltage and supplies it to the respective serially connected light emitting elements. The drive device includes a control circuit adapted to generate the instruction signals;

receive at a feedback voltage terminal of the control circuit a detection voltage generated by dividing the output voltage of a power supply circuit supplying a drive voltage to the light emitting elements; and compare the detection voltage with a reference voltage to generate, at a control signal output terminal of the control circuit, the control signal to the power supply circuit based on the comparison of the detection voltage.

Thus, means for generating a high-voltage is provided to the display device which requires high-voltage. As a consequence, a high-voltage circuit is needed only in the display device. Other components of the electronic apparatus can be constructed using low-voltage ICs that comply with the power supply voltage.

In the example shown herein, the multiplicity M of independently operable sections is two, so that the multiplicity N of light emitting element series are divided to two groups in association with the two sections. Only the light emitting element series belonging to one of two sections is activated at a time to emit light. When none of the two sections needs to be activated, generation of the high voltage is stopped.

Thus, only one of M (=2) sections is operated at a time, and the rest of the serially connected light emitting elements of another section not in operation will be fed insufficient currents under low voltages. Moreover, when no display section is lighted, the high voltage is not generated, so that power consumption during this period is greatly reduced.

BEST MODE FOR CARRYING OUT THE INVENTION

Referring to the accompanying drawings, the invention will now be described in detail by way of example, with a particular reference to an electronic apparatus equipped with light emitting elements in the form of LEDs.

Figure 1:
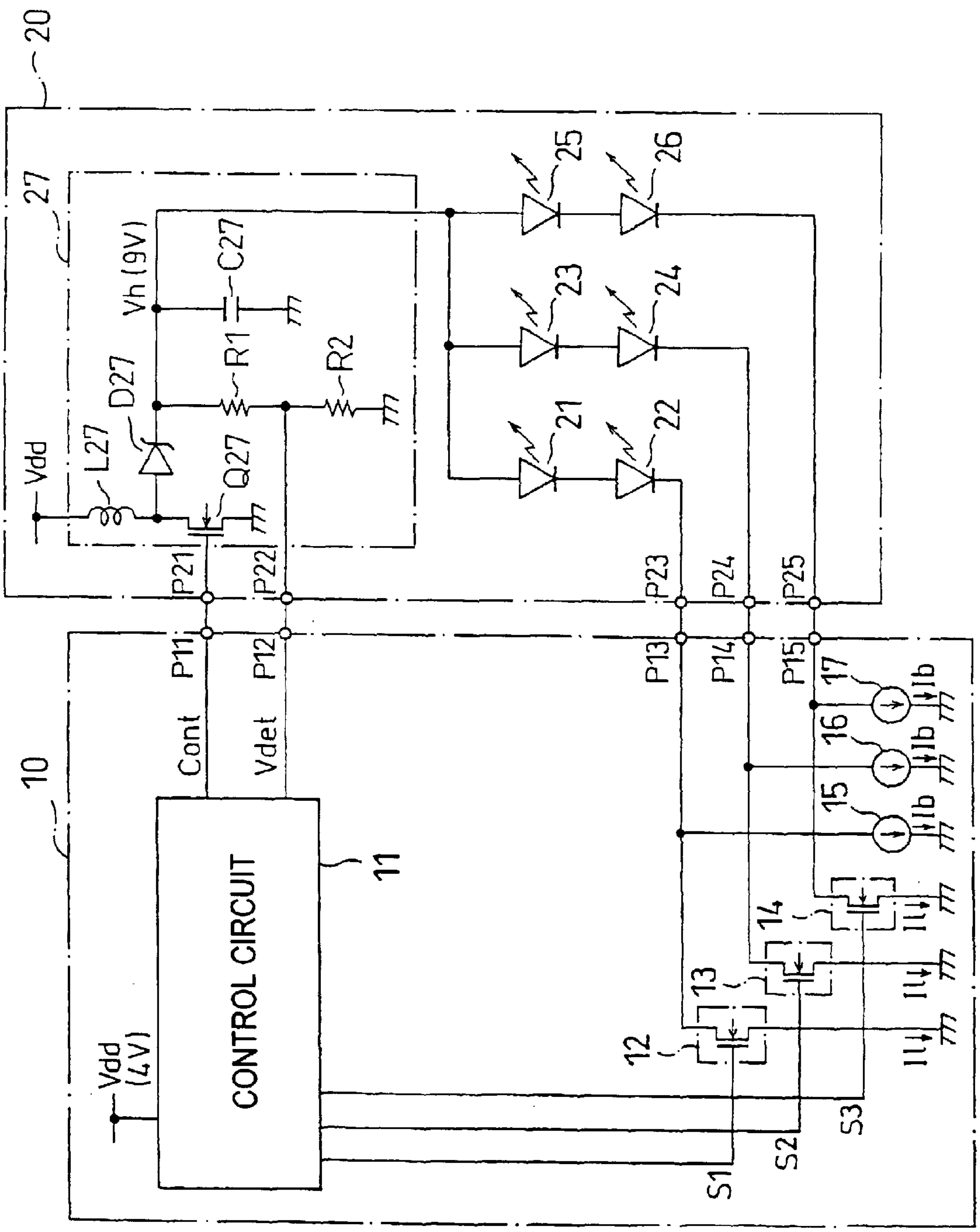
FIG. 1 shows a general circuit structure of an electronic apparatus equipped with light emitting elements in accordance with one embodiment of the invention.
Figure 2:
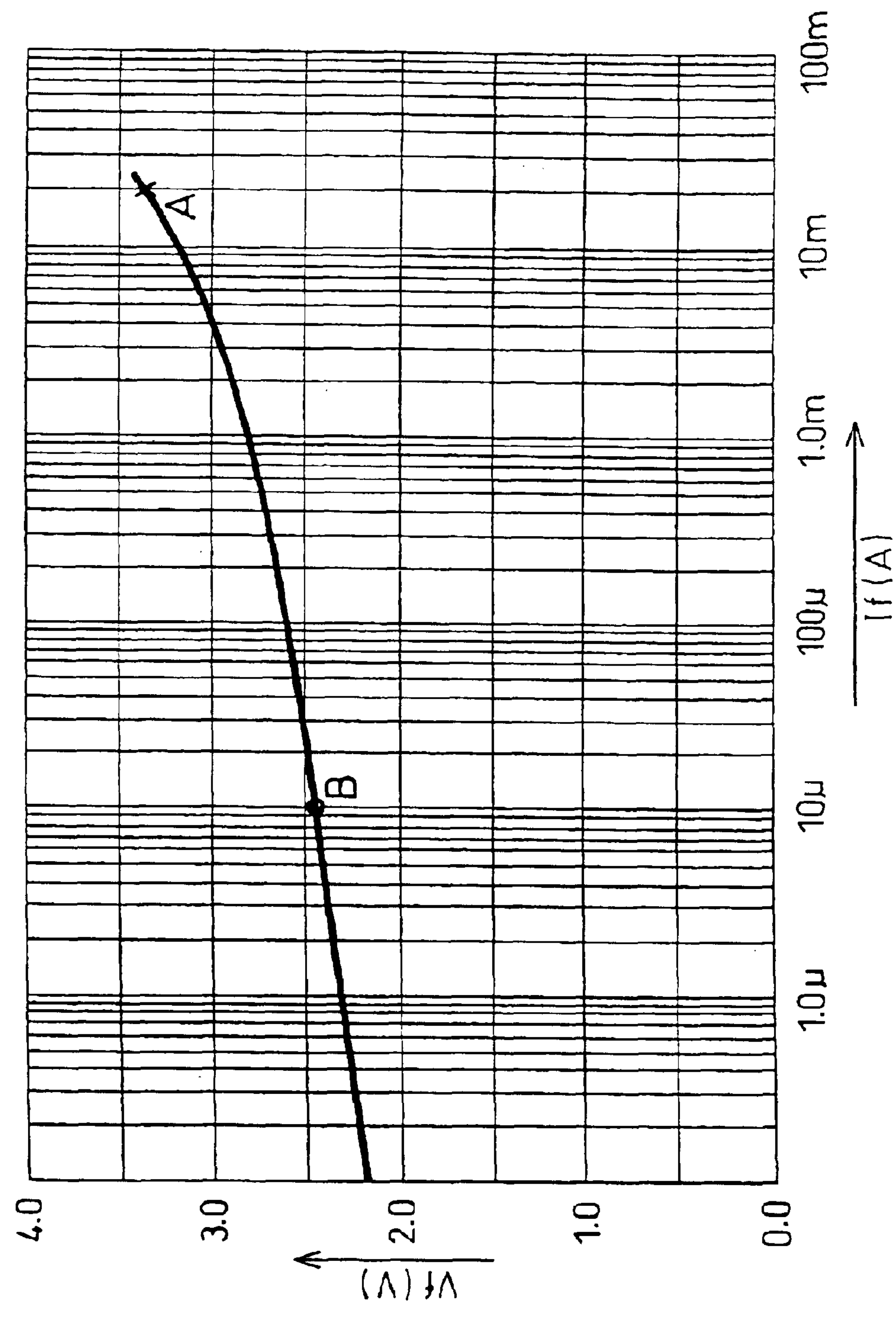
FIG. 2 is a graph showing the current-voltage characteristic of LEDs serving as light emitting elements.

FIG. 1 illustrates a general circuit structure of an electronic apparatus equipped with light emitting elements in accordance with one embodiment of the invention. FIG. 2 is a graphical representation of the current-voltage characteristic of LEDs serving as light emitting elements.

As shown in FIG. 1, this electronic apparatus includes a drive device 10 and a display device 20.

The display device 20 is formed on an IC chip for use as a display unit of an electronic apparatus such as a cellular phone.

The display device 20 is provided with a first serially connected light emitting elements (such serially connected light emitting elements will be referred to as light emitting element series) including LEDs 21 and 22, a second light emitting element series including LEDs 23 and 24, and a third light emitting element series including LEDs 25 and 26. In the example shown herein, the multiplicity N of light emitting element series is 3. The first series of LEDs 21 and 22 may be used as a backlight source of the LCD 4 of FIG. 3, and the second and third series of LEDs 23–26 may be used as backlight sources of the LCD 2 of FIG. 3. The LCD 2 and LCD 4 can be independently operated. Thus, in the example shown herein, the multiplicity M of independently operable sections is 2.

In this way, the number M of independently operable sections and the number N of light emitting element series can be determined so that each light emitting element series includes the same number of LEDs (the number being 2 in this example).

It is necessary to flow a nominal current If through the LEDs 21–26 in order to acquire required luminescence from the LEDs. It is noted that voltages $V_f$ impressed on the respective LEDs 21–26 vary from one LED to another within production tolerance. For example, $V_f$ of white LEDs and blue LEDs is likely to vary in a range from 3.4V to 4.0V.

Thus, taking account of variations in the operational voltage of the LEDs and assuming that the maximum operable voltage for two serially connected LEDs is 8V ($2V_f$), it is a common practice to prepare a step-up voltage Vh of about 9V for $2V_f$ plus an extra voltage for controlling the LEDs.

The step-up voltage Vh (=9V) is obtained by stepping up a power supply voltage Vdd (=4V) using a step-up switching power supply circuit 27. The power supply circuit 27 has a coil L27 connected in series with an N-type MOS transistor Q27 serving as a control switch. This series circuitry is connected between the power supply voltage Vdd and the ground. An output capacitor C27 is supplied to the step-up voltage Vh, from the node of the coil L27 and the MOS transistor Q27 via a Schottky diode D27 that incurs only a negligible voltage drop.

In order to maintain this step-up voltage Vh constant, the step-up voltage Vh is divided by a pair of resistors R1 and R2 to generate a low detection voltage Vdet. This detection voltage Vdet is fed back to the drive device 10 via the pin P22 of the display device 20. On the other hand, in order to control the ON/OFF operation (i.e. switching) of the transistor Q27, a switching control signal Cont is supplied from the drive device 10 to the pin P21 to which the transistor Q27 is connected. The constant step-up voltage Vh is supplied to the respective first ends (which are LEDs 21, 23, and 25 in this example) of the light emitting element series under the ON/OFF control by the transistor Q27.

The drive device 10 for driving the display device 20 is also formed on an IC chip.

The drive device 10 has a control circuit 11 for generating different kinds of control signals, drivers 12–14 for driving the LEDs 21–26, and constant-current sources 15–17 connected in parallel with the respective drivers 12–14 and functioning as bypass means.

The control circuit 11 receives the detection voltage Vdet from the power supply circuit 27, as described previously. This detection voltage Vdet is compared with an internal reference voltage (not shown) to generate a switching control signal Cont based on the comparison. The switching control signal Cont is supplied to the gate of the transistor Q27 of the power supply circuit 27 via the pins P11 and P21, thereby controlling the provision of the predetermined step-up voltage Vh from power supply circuit 27.

The control circuit 11 outputs instruction signals S1–S3 to the respective drivers 12–14. The drivers 12–14 are respectively connected between the ground and the pins P13–P15 connected to respective second ends (that is, the LED 22, LED 24, and LED 26 in this example) of the light emitting element series. These drivers are turned ON or OFF depending on the levels of the corresponding instruction signals S1–S3 being HIGH or LOW. Hereinafter the reception of an instruction signal means the reception of a HIGH signal.

In the example shown herein, the drivers 12–14 are constant-current drivers. Alternatively, they can be simpler switches such as MOS transistors. However, since the amounts of light emitted from the LEDs are determined by the magnitudes of the current flowing through them, drivers capable of providing constant currents, i.e. constant-current drivers, are preferable to the simple switches. Each of the constant-current drivers 12–14 can be easily constructed in the form of, for example, an ordinary constant-current circuit using transistors, adapted to be switched ON or OFF by a respective instruction signal S1–S3.

Constant-current sources 15–17 are constant-current circuits each connected in parallel with associated one of the drivers 12–14. Each of these constant-current sources 15–17 is adapted to pass through it a minute constant current Ib when associated one of the drivers 12–14 is turned OFF. In this sense, the constant-current sources 15–17 can be considered as bypass means. The constant current Ib is a very small current as compared with the constant current 11 that flows through associated one of the constant-current drivers 12–14 during its ON-period.

As a consequence, the additional energy loss by the constant-current sources 15–17 is negligibly small. Nevertheless, such extremely small constant current Ib flowing through the light emitting elements 21–26 can maintain the elements in stabilized non-luminescent conditions. When the bypass means suffices to simply allow a minute current to flow through a corresponding series of light emitting elements, each of the constant-current sources 15–17 can be replaced by another element such as a resistor.

Figure 3A:
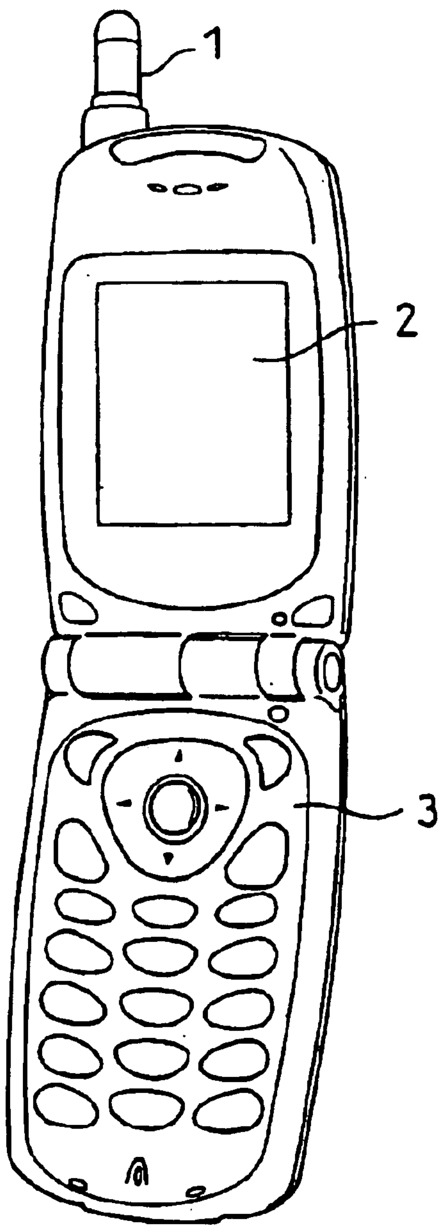
FIG. 3 shows an appearance of a cellular phone to which the invention is applied.
Figure 3B:
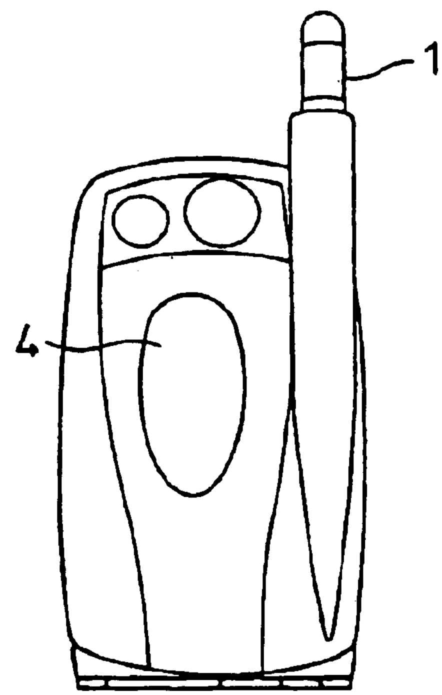
Figure 4:
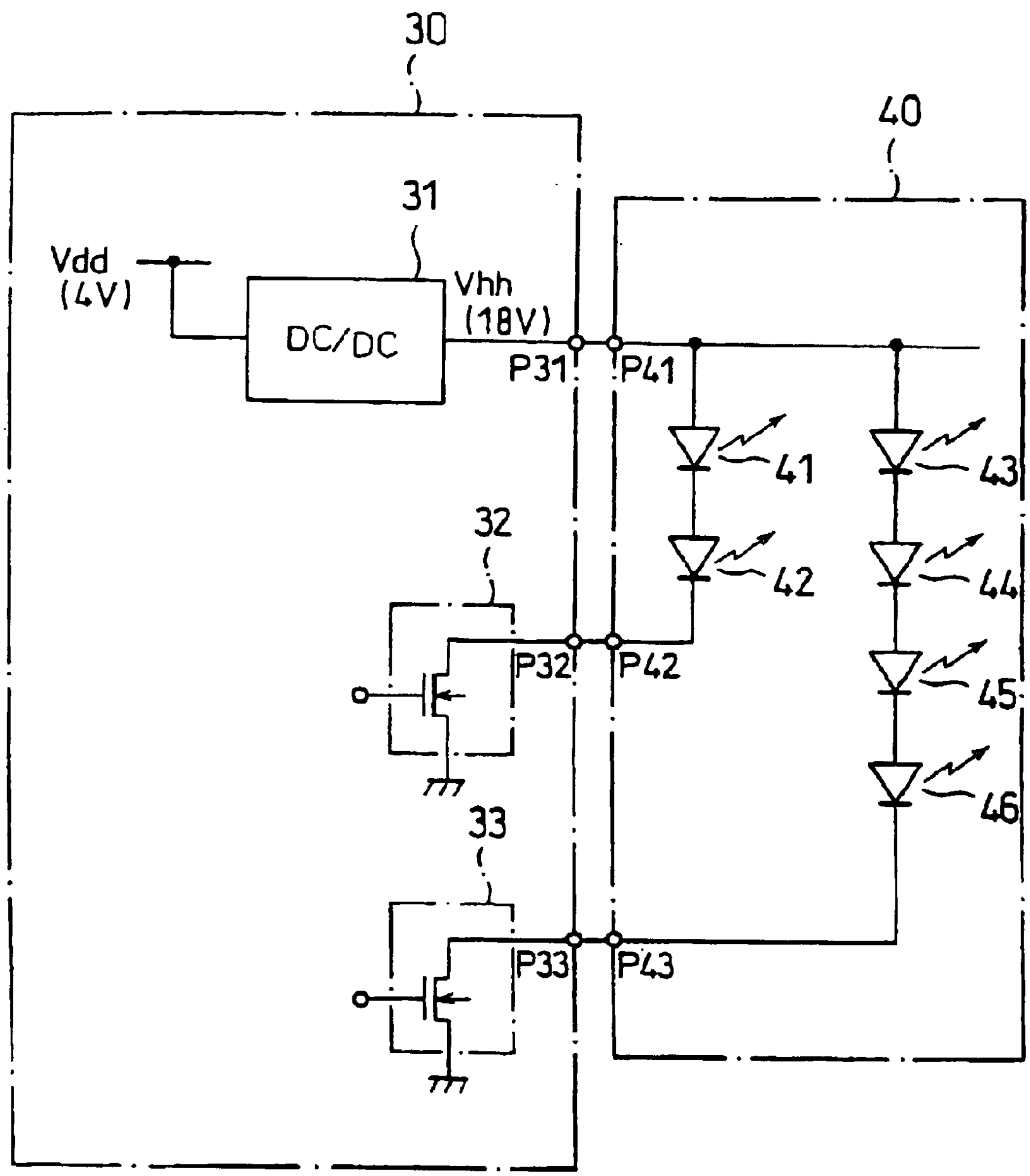
FIG. 4 shows a conventional circuit structure for driving LEDs used in a cellular phone.

Referring to FIG. 2 and FIG. 3, operation of the electronic apparatus of FIG. 1 will now be described.

The cellular phone shown in FIG. 3 is normally folded up, as shown in FIG. 3(*b*). In this cellular phone, when there is received a telephone call or an e-mail (hereinafter referred to as call), the call is displayed on the sub-display section 4.

To do this, upon receipt of a call, the control circuit 11 generates a switching-control signal Cont and supplies it to the power supply circuit 27. The control signal Cont performs ON-OFF control of the control switch Q27 of the power supply circuit 27, resulting in charging of the capacitor C27. The voltage across the charged output capacitor C27 is divided by the voltage-dividing resistors R1 and R2. The divided voltage is fed back as a detection voltage Vdet to the control circuit 11. The power supply circuit 27 is controlled such that the detection voltage Vdet equals the reference voltage established by the control circuit 11, thereby outputting the predetermined step-up voltage Vh.

At the same time, an instruction signal S1 is supplied from the control circuit 11 to turn ON the constant-current driver 12. This causes the power supply circuit 27 to supply the predetermined current 11 to the LEDs 21 and 22 of the first light emitting element series belonging to the sub-display section 4.

A typical current-voltage characteristic ($I_f$-$V_f$ curve) is shown in FIG. 2 for a white LED. The abscissa represents logarithmic current $I_f$ and the ordinate represents voltage $V_f$. This LED emits light when activated by the current $I_f$ in the range between 1.5–20 mA. FIG. 2 shows a case where current $I_f$ is 20 mA. In this instance, each LED is operated at current 20 mA and voltage 3.4V, as indicated at point A of FIG. 2.

The constant-current driver 12, therefore, is set to provide a constant current I1 of 20 mA as the activation current of the LED. Then the voltage impressed on the constant-current driver 12 will be $Vh-2\times V_f$, which turns out to be 2.2V since $V_f$ of LEDs 21 and 22 is 3.4V. In the event that LEDs happen to have the maximum $V_f$ of 4.0V, the constant-current driver 12 is impressed with 1.0V. The constant-current driver 12 can operate normally and provides a constant current so far as the voltage supplied to the driver 12 exceeds its saturation voltage (about 0.3V). As a consequence, even if the LEDs exhibit such variation in $V_f$ of, variation will not affect the operation of the constant-current driver 12.

The voltage impressed on the constant-current driver 12 will be impressed on the pin P13. This voltage is lower than the withstand voltage (about 6.0–6.5V) of the drive device 10 and the power supply voltage Vdd (4.0V).

On the other hand, when the call is displayed on the sub-display section, neither of the LEDs 23 and 24 of the second light emitting element series and the LEDs 25 and 26 of the third light emitting element series of the main display section 2 will not be activated for emission of light. Hence, instruction signals S2 and S3 will not be supplied to the constant-current drivers 13 and 14, respectively, so that the drivers will remain turned OFF. It should be noted that in such cases the pins P14 and P15 would be impressed with the step-up voltage Vh if mere constant-current drivers were provided as in conventional drive devices.

However, in accordance with the invention, the constant-current sources 15–17 are respectively connected in parallel to the constant-current drivers 12–14 to serve as bypass means. Thus, when the constant-current drivers 13 and 14 are turned OFF, minute constant currents Ib flow from the respective constant-current sources 16 and 17 through the LEDs 23–26. As a consequence, the pins P14 and P15 of the drive device 10 are impressed only with low voltages below the step-up voltage Vh.

That is, as seen from the $I_f$-$V_f$ characteristic curve of the LED shown in FIG. 2, the voltage $V_f$ will not lower greatly even if the current If is reduced appreciably below the nominal operational range (1.5–20 mA) necessary for emission of light. In the example shown herein, the magnitude of the minute constant current Ib is set to 10 $\mu$A. It is seen from point B of FIG. 2 that under this condition (If flowing through each LED being 10 $\mu$A) each of the LEDs is impressed with $V_f$ of 2.45V.

It is noted that with the current If being 10 $\mu$A, the LEDs remain inactivated, that is, their luminescence cannot be observed by eyes.

Then the voltage V impressed on the constant-current sources 16 and 17 will be 4.1V, as calculated by the formula "$V=Vh-2\times V_f$", where $V_f$ is now 2.45V for the respective LEDs 23–26. This voltage V becomes still smaller in the event that the voltage $V_f$ of each LED varies towards the upper bound of the variation.

This 4.1V is sufficient for the constant-current sources 16 and 17 to function as constant-current sources. Moreover, this voltage is lower than the withstand voltage (about 6.0–6.5V) of the drive device 10. The constant current Ib can be further reduced while keeping the voltages supplied to the pins P14 and P15 below the withstand voltage of the drive device 10. In practice it is preferable to set the constant current Ib to about 1.0 $\mu$A.

The constant current Ib is wasteful in that it does not contribute to luminescence of LEDs. But since the current Ib is far smaller than the constant current I1 for the activation of the LEDs (Ib being smaller than I1 by several orders of magnitude), the energy loss due to current Ib is negligible.

Next, if the cellular phone is unfolded (or opened) as shown in FIG. 3(*a*) upon receipt of a call, the sub-display section 4 is switched OFF and the main display section 2 will be switched ON to display the information received.

This causes the control circuit 11 to send instruction signals S2 and S3 to the constant-current drivers 13 and 14 to turn them ON, which in turn supply constant currents I1 to the LEDs 23 and 24 of the second series and to the LEDs 25 and 26 of the third series. Accordingly, the LEDs 23–26 emit light.

On the other hand, the constant-current driver 12 will be turned OFF, since instruction signal S1 is not sent to the constant-current driver 12. In this case, a minute current Ib flows through the LEDs 21 and 22, since the constant-current source 15 is connected in parallel with the de-activated constant-current driver 12. However, since the constant current Ib is much smaller than the constant current I1 required for the LEDs to emit light, the LEDs 21 and 22 of the first light emitting element series belonging to the sub-display section 4 will stay non-luminescent. It is noted that the power supply circuit 27 still keeps on generating the step-up voltage Vh.

In this case, conditions of the LEDs 21 and 22 and the pin P13 and the conditions of the LEDs 23–26 and the pins P14 and P15 are reversed as compared with the case described above in connection with the call being displayed by the sub-display section 4. Detailed description of the conditions, therefore, will not be repeated here again, but it will be understood that the LEDs 23–26 are activated for emission of light, and that the voltages of all the pins of the drive device 10 are suppressed below the withstand voltage.

Next, as the cellular phone unit is folded again as shown in FIG. 3(*b*) after the communication, both the main display 2 and sub-display 4 will be switched OFF. In this case, instruction signals S1–S3 from the control circuit 11 are terminated to immediately stop emission of light from the LEDs 21–26. Operation of the power supply circuit 27 is also stopped to cut off the switching loss by the circuit and energy loss by the constant current Ib. To stop the operation of the power supply circuit 27, the control switch Q27 may be turned OFF or, alternatively, the power supplied to the coil L27 may be cut off using an additional switch.

Although the invention has been described above with a particular reference to the foldable cellular phone unit, it should be understood that the invention will not be limited to this embodiment. The invention can be modified within the spirit and the scope of the invention. For example, the invention may be applied to any electronic apparatus having a multiplicity N of light emitting element series that are supplied to first ends thereof with a high voltage higher than a given supply voltage and divided into a multiplicity M of independently operable sections (M≦N).

Industrial Applicability

As described above, a drive device of the invention is suitable for use as a drive of light emitting elements such as LEDs serving as backlight sources of an LCD. Such LCD can be suitably installed in an electronic apparatus such as a cellular phone.

What is claimed is:

1. A drive device for driving light emitting elements, comprising:

at least one driver having one end connected to a terminal to which one corresponding light emitting element series is connected, said driver turned ON or OFF in accordance with an instruction signal such that, when said driver is turned ON, said driver provides said light emitting element series with a current for emission of light;

at least one bypass means, connected in parallel with said at least one driver, for providing said light emitting element series with a current that is insufficient for said light emitting elements thereof to emit light when said driver is turned OFF;

wherein said light emitting elements are light emitting diodes; and a control circuit is adapted to:

generate said instruction signals;

receive at a feedback voltage terminal of said control circuit a detection voltage generated by dividing the output voltage of a power supply circuit supplying a drive voltage to said light emitting elements; and compare said detection voltage with a reference voltage to generate, at a control signal output terminal of said control circuit, said control signal to said power supply circuit based on the comparison of said detection voltage.

2. An electronic apparatus equipped with light emitting elements, comprising:

a display device having a multiplicity N of light emitting element series having first ends connected to a voltage higher than a given power supply voltage and second ends connected to different external terminals, said N light emitting element series divided into a multiplicity M (M≦N) of independently operable sections; and a drive device for driving said light emitting elements, said drive device having:

N drivers respectively connected to the terminals to which said different external terminals are connected, each of said N drivers turned ON or OFF in accordance with an instruction signal supplied thereto such that when turned ON said driver provides a current to activate associated one of said light emitting element series for emission of light; and N bypass means, connected in parallel with the respective drivers, for providing the corresponding light emitting element series with currents that are insufficient for the associated light emitting elements to emit light when the associated drivers are turned OFF.

3. The electronic apparatus according to claim 2, wherein said light emitting elements are light emitting diodes.

4. The electronic apparatus according to claim 3, wherein each of said N drivers is a constant-current driver for providing a constant current when turned ON; and each of said N bypass means is a constant-current source.

5. The electronic apparatus according to claim 3, wherein said display device further has a voltage step-up means for stepping up a given supply voltage to said high voltage to be supplied to each of said light emitting element series.

6. The electronic apparatus according to claim 5, wherein said drive device includes a control circuit adapted to generate said instruction signals;

receive at a feedback voltage terminal of said control circuit a detection voltage generated by dividing said high voltage; and compare said detection voltage with a reference voltage to generate, at a control signal output terminal of said control circuit, said control signal to said power supply circuit based on the comparison of said detection voltage.

7. The electronic apparatus according to claim 5 or 6, wherein said multiplicity M of independently operable sections is 2;

said multiplicity N of light emitting elements series are divided into two groups in association with said two sections such that only the light emitting element series belonging to one section are turned ON for emission at a time; and generation of said high voltage is stopped when both of said two sections are not operated for emission of light.

8. A drive device for driving light emitting elements, comprising:

at least one driver having one end connected to a terminal to which one corresponding light emitting element series is connected, said driver turned ON or OFF in accordance with an instruction signal such that, when said driver is turned ON, said driver provides said light emitting element series with a current for emission of light;

at least one bypass means, connected in parallel with said at least one driver, for providing said light emitting element series with a current that is insufficient for said light emitting elements thereof to emit light when said driver is turned OFF;

wherein said light emitting elements are light emitting diodes;

wherein said driver is a constant-current driver for providing a constant current when turned ON;

wherein said bypass means is a constant-current source; and a control circuit is adapted to:

generate said instruction signals;

receive at a feedback voltage terminal of said control circuit a detection voltage generated by dividing the output voltage of a power supply circuit supplying a drive voltage to said light emitting elements; and compare said detection voltage with a reference voltage to generate, at a control signal output terminal of said control circuit, said control signal to said power supply circuit based on the comparison of said detection voltage.

* * * * *